US010302300B2

(12) United States Patent
Kishore et al.

(10) Patent No.: US 10,302,300 B2
(45) Date of Patent: May 28, 2019

(54) FEED INJECTOR SYSTEM

(71) Applicant: General Electric Company, Schenectady, NY (US)

(72) Inventors: Allam Nanda Kishore, Bangalore (IN); Madhu Deena Dayal Naidu, Bangalore (IN)

(73) Assignee: General Electric Company, Schenectady, NY (US)

( * ) Notice: Subject to any disclaimer, the term of this patent is extended or adjusted under 35 U.S.C. 154(b) by 976 days.

(21) Appl. No.: 14/288,095

(22) Filed: May 27, 2014

(65) Prior Publication Data

US 2015/0345782 A1 Dec. 3, 2015

(51) Int. Cl.
*F23D 14/76* (2006.01)
*F23D 14/78* (2006.01)
(Continued)

(52) U.S. Cl.
CPC ............. *F23D 11/36* (2013.01); *B23P 19/00* (2013.01); *C10J 3/50* (2013.01); *F23D 1/00* (2013.01); *F23D 1/005* (2013.01); *F23D 14/76* (2013.01); *F23D 14/78* (2013.01); *C10J 2200/152* (2013.01); *C10J 2300/1653* (2013.01); *F23D 2201/10* (2013.01); *Y02E 20/16* (2013.01); *Y02E 20/18* (2013.01); *Y10T 29/4935* (2015.01)

(58) Field of Classification Search
CPC .................................. F23D 14/76; B23P 19/00
USPC ... 431/8, 142, 144, 154, 159, 160, 195, 364; 239/132.1, 132.5, 132.3, 416, 417, 422, 239/423, 589; 72/53; 48/86 R, 89, 48/197 R, 202, 206, 215; 29/428
See application file for complete search history.

(56) References Cited

U.S. PATENT DOCUMENTS 3,743,606 A * 7/1973 Marion et al. .......... C01B 3/363
252/373
4,225,307 A * 9/1980 Magera ................... F27D 1/045
138/147
(Continued)

FOREIGN PATENT DOCUMENTS

| CN | 102277199 A | 12/2011 |
| CN | 102373093 A | 3/2012 |
| WO | 9901525 A1 | 1/1999 |

OTHER PUBLICATIONS

European Search Report and Opinion issued in connection with corresponding EP Application No. 15168963.5 dated Sep. 28, 2015.
(Continued)

*Primary Examiner* — Steven B McAllister
*Assistant Examiner* — Desmond C Peyton
(74) *Attorney, Agent, or Firm* — Fletcher Yoder, P.C.

(57) ABSTRACT

A system includes a feed injector that may supply a feedstock to a gasifier. The feed injector includes one or more conduits extending toward a tip portion having an outlet, cooling coil coupled to the tip portion, and a protective shell including a first protective shell portion coupled to a second protective shell portion. The protective shell surrounds the tip portion and at least portions of the one or more conduits and the cooling coil. The feed injector also includes one or more mounting structures disposed along an outer perimeter of the feed injector. The one or more mounting structures may facilitate coupling of the first protective shell portion, the second protective shell portion, and the feed injector.

19 Claims, 6 Drawing Sheets

(51) Int. Cl.
   *B23P 19/00* (2006.01)
   *F23D 11/36* (2006.01)
   *C10J 3/50* (2006.01)
   *F23D 1/00* (2006.01)

(56) References Cited

U.S. PATENT DOCUMENTS

| | | | | |
|---|---|---|---|---|
| 4,330,266 | A * | 5/1982 | Suey | F27D 3/022 |
| | | | | 138/149 |
| 4,443,228 | A * | 4/1984 | Schlinger | C01B 3/363 |
| | | | | 239/112 |
| 4,491,456 | A * | 1/1985 | Schlinger | C01B 3/363 |
| | | | | 252/373 |
| 5,515,794 | A * | 5/1996 | Kassman | C10J 3/50 |
| | | | | 110/260 |
| 5,630,853 | A * | 5/1997 | Eales | C10J 3/08 |
| | | | | 110/165 R |
| 5,785,721 | A * | 7/1998 | Brooker | C10J 3/506 |
| | | | | 239/419.5 |
| 6,162,266 | A | 12/2000 | Wallace et al. | |
| 6,228,224 | B1 * | 5/2001 | Brooker | B01J 7/00 |
| | | | | 202/217 |
| 6,575,738 | B1 * | 6/2003 | Nguyen | F27D 3/022 |
| | | | | 138/149 |
| 6,892,654 | B2 | 5/2005 | Whittaker et al. | |
| 7,993,131 | B2 * | 8/2011 | Douglas | C10J 3/485 |
| | | | | 110/235 |
| 8,151,716 | B2 | 4/2012 | Harned et al. | |
| 8,475,545 | B2 | 7/2013 | Steinhaus et al. | |
| 8,580,001 | B2 * | 11/2013 | Thacker | C10J 3/30 |
| | | | | 239/132.5 |
| 2009/0202955 | A1 | 8/2009 | Jang | |
| 2010/0037613 | A1 * | 2/2010 | Masso | F23D 11/36 |
| | | | | 60/734 |
| 2011/0217661 | A1 * | 9/2011 | Van Der Ploeg | C10J 3/506 |
| | | | | 431/160 |
| 2012/0036776 | A1 | 2/2012 | Stevenson et al. | |
| 2012/0132725 | A1 * | 5/2012 | Dinu | F23D 1/005 |
| | | | | 239/132.3 |
| 2012/0318887 | A1 | 12/2012 | Pan | |
| 2013/0112772 | A1 * | 5/2013 | Kishore | F23D 1/005 |
| | | | | 239/132.3 |
| 2013/0273480 | A1 * | 10/2013 | Santoianni | F23D 14/66 |
| | | | | 431/11 |
| 2014/0263746 | A1 * | 9/2014 | Archangel | F23D 14/58 |
| | | | | 239/397.5 |

OTHER PUBLICATIONS

First Office Action and Search issued in connection with corresponding CN Application No. 201510276850.9 dated Nov. 30, 2018 (English Translation Unavailable).

* cited by examiner

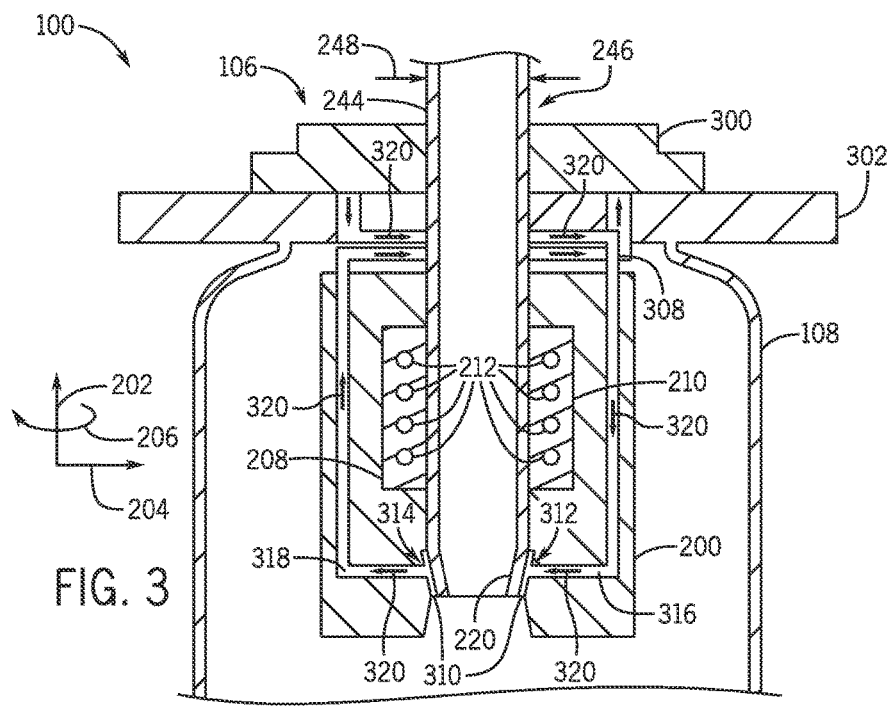
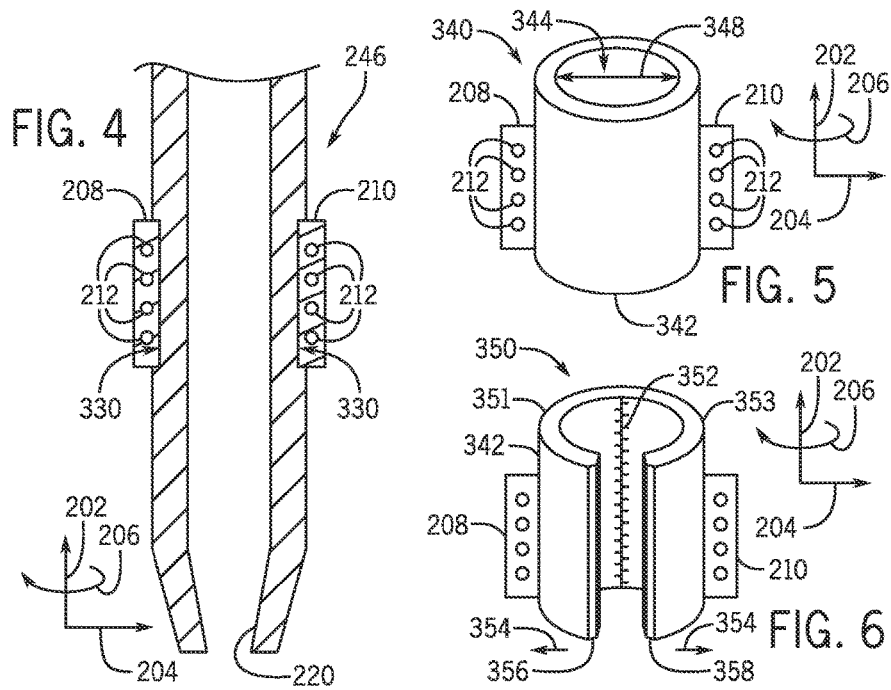

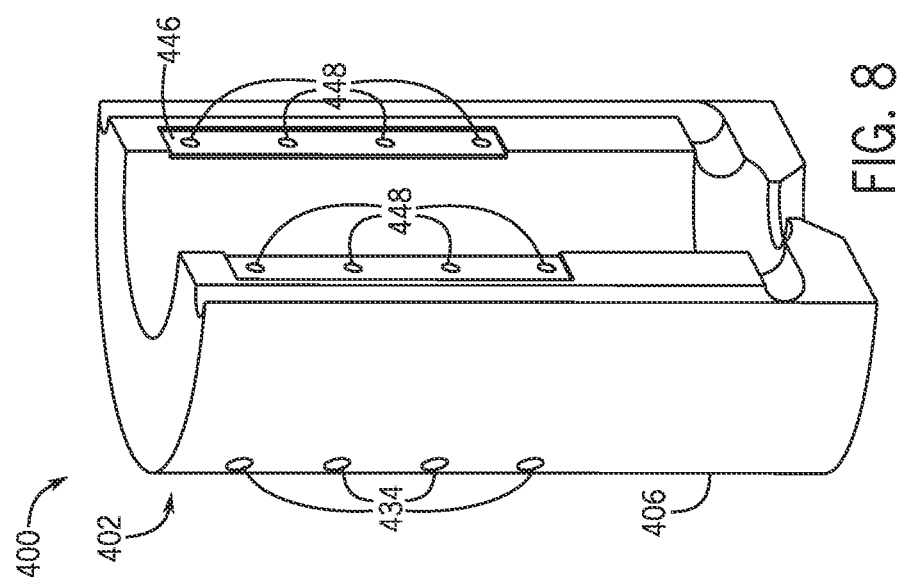
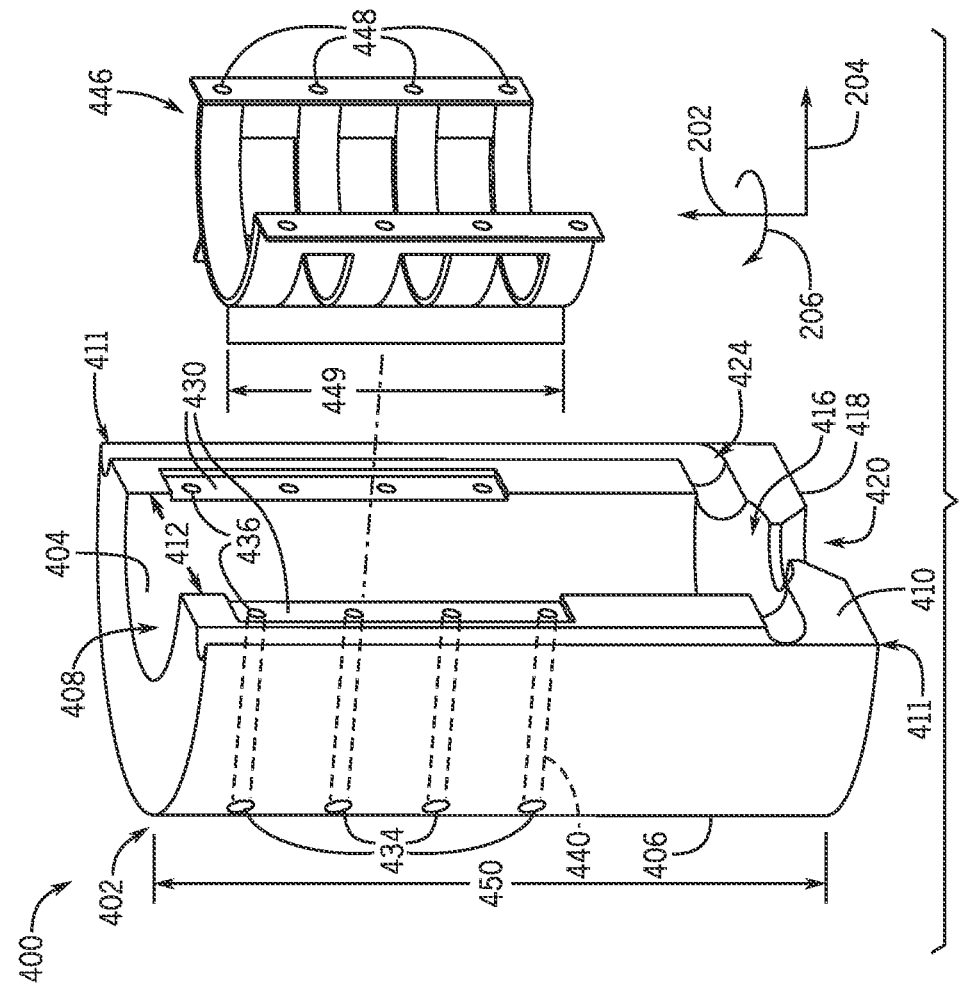
FIG. 7
FIG. 8

FEED INJECTOR SYSTEM

BACKGROUND

The subject matter disclosed herein relates to feed injectors, and, more particularly, to a protective shell for a gasification feed injector.

A variety of reactors and/or combustion systems employ feed injectors to inject a feedstock into a reactor or combustion chamber. For example, an integrated gasification combined cycle (IGCC) power plant includes a gasifier with one or more feed injectors. The feed injectors supply a fuel or feedstock, such as an organic feedstock, into the gasifier along with oxygen and steam to generate a syngas. In general, a gasification reaction occurs downstream from the feed injectors. However, a flame and/or heat from the reaction in close proximity to the feed injectors can reduce the life of the feed injectors, particularly if the feed injectors exceed certain temperatures. For example, the feed injector may be subject to increasingly greater temperatures toward the tip (e.g., nozzle) and/or other locations close to the flame. Additionally, corrosive components within the syngas (e.g., sulfur, chlorides, etc.) may cause corrosion of the feed injectors. As such, the lives of feed injectors may be reduced by such high temperatures and corrosive materials, even when cooling techniques are used.

BRIEF DESCRIPTION

Certain embodiments commensurate in scope with the originally claimed invention are summarized below. These embodiments are not intended to limit the scope of the claimed invention, but rather these embodiments are intended to provide a brief summary of possible forms of the invention. Indeed, the invention may encompass a variety of forms that may be similar to or different from the embodiments set forth below.

In one embodiment, a system is provided. A system includes a feed injector that may supply a feedstock to a gasifier. The feed injector includes one or more conduits extending toward a tip portion having an outlet, cooling coil coupled to the tip portion, and a protective shell including a first protective shell portion coupled to a second protective shell portion. The protective shell surrounds the tip portion and at least portions of the one or more conduits and the cooling coil. The feed injector also includes one or more mounting structures disposed along an outer perimeter of the feed injector. The one or more mounting structures may facilitate coupling of the first protective shell portion, the second protective shell portion, and the feed injector.

In a second embodiment, a system is provided. The system includes a protective shell that may surround one or more conduits and a tip portion of a feed injector. The protective shell includes a central bore, a first shell portion and a second shell portion coupled together about the central bore, a first recess and a second recess disposed along an interface between the first shell portion and the second shell portion. The first and second recesses may align with one or more structural plates disposed along an outer perimeter of the feed injector. The protective shell further includes a channel disposed along an inner wall of the protective shell. The channel may receive a cooling coil coupled to the tip portion.

In a third embodiment, a method is provided. The method includes attaching a first shell portion and a second shell portion of a protective shell to an outer perimeter of a feed injector. The protective shell surrounds the one or more conduits and a tip portion of the feed injector and attaching the first and second shell portions includes aligning a first structural plate and a second structural plate disposed on the perimeter of the feed injector with one or more recesses along an interface between the first and second shell portions and securing the first shell portion, the second shell portion, and the first and second structural plates to form the protective shell that may block a syngas from contacting the outer perimeter and the tip portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a partial cross-sectional view of an embodiment of the feed injector of FIG. 2 coupled to the gasifier of FIG. 1;

FIG. 4 is a partial cross-sectional view of an embodiment of a recessed bayonet of the feed injector of FIG. 2;

FIG. 5 is an embodiment of a cylindrical ring that may be used with the feed injector of FIG. 2;

FIG. 6 is an embodiment of a jointed cylindrical ring that may be used with the feed injector of FIG. 2;

FIG. 7 is a perspective view of an embodiment of a protective shell portion of a multi-section protective shell that may be used with the feed injector of FIG. 2;

FIG. 8 is a perspective view of an embodiment of the protective shell portion of FIG. 7;

DETAILED DESCRIPTION

Figure 1:
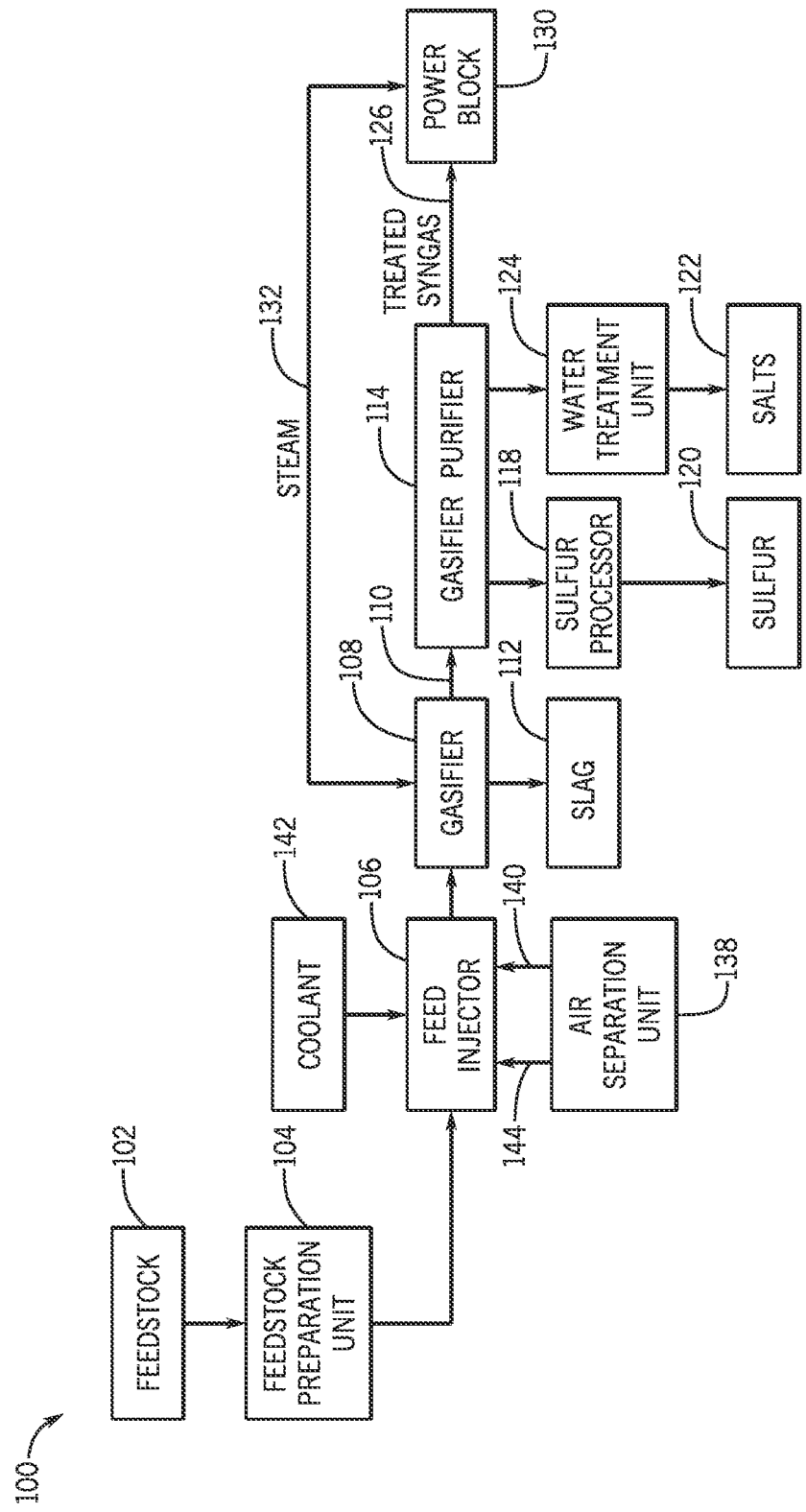
FIG. 1 is a schematic block diagram of an embodiment of a gasification system including a feed injector.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A reactor or gasification system may utilize feed injectors to inject a feedstock or fuel, and other fluids, such as oxygen and water, into a chamber (e.g., a gasification chamber for gasification or partial oxidation). In the present discussion, the terms fuel and feedstock may be used interchangeably, and may refer to any substance used to drive a reaction, gasification, partial oxidation, or complete oxidation. Likewise, the terms reaction, oxidation, and gasification may be used interchangeably, and may refer to one or more chemical reactions, oxidation, and/or gasification. In certain embodiments, an IGCC power plant may have a gasifier that includes one or more gasification feed injectors. Because certain processes that occur during gasification (e.g., partial oxidation) occur near and around a tip (e.g., a fluid outlet or nozzle) and bayonet (e.g., a conduit or hollow body) of the feed injector, the tip and bayonet may be exposed to temperatures up to approximately 1,300 degrees Celsius (° C.). In addition, hot combustion gases (e.g., untreated syngas) may recirculate back toward the feed injector. Such high temperatures may cause degradation to the feed injector, even in embodiments where the injector is made from materials specifically designed for high temperatures. In addition, gasification of sulfur containing feedstock may result in corrosion of the tip and bayonet due to interaction of sulfur with feed injector surfaces, or otherwise corrosive materials, from untreated syngas generated within the gasifier. Cooling methods may be utilized to increase the life of feed injectors by cooling the tip of the feed injectors. However, such methods can be insufficient because an outer surface of the feed injector (e.g., an outer bayonet) may be exposed to hot recirculated gases. Moreover, cooling methods may not mitigate corrosion of the tip and/or the outer bayonet from sulfur attack. The variation in temperatures during startup, normal operation, turndown and shut down conditions may cause thermal expansion and fatigue leading to radial and/or circumferential cracks near the tip. Similarly, the corrosive materials may induce erosion and spalling (e.g., chipping, fragmentation) of the feed injector surfaces exposed to the gasification zone, further decreasing the life of the feed injectors. Accordingly, as discussed in detail below, present embodiments include a protective shell designed to mitigate the undesirable effects caused by elevated temperatures and corrosion-causing materials (e.g., sulfur).

Turning now to the drawings, FIG. 1 is a diagram of an embodiment of an IGCC system 100 that may produce a syngas to generate power. As discussed in detail below, the IGCC system 100 may include an embodiment of a feed injector that includes a protective shell, which may be a thermal barrier (e.g., heat blocking shell) capable of withstanding temperatures in excess of those found in the gasification reaction environment. In certain embodiments, the protective shell may serve as a sacrificial thermal barrier (e.g., one that can be replaced at regular intervals or as appropriate). The protective shell may act as a heat shield to the feed injector, reducing thermal fatigue and surface cracks. In addition, the protective shell (e.g., corrosion blocking shell) may block corrosion of the feed injector surfaces. While the present embodiments of the protective shell are discussed in the context of the IGCC system 100, the IGCC system 100 is used as one non-limiting example, and it should be understood that the protective shell may be used in other types of systems in which gasification is used. Other elements used by the IGCC system 100 may include a feedstock 102 (e.g., fuel), which may be a gas, solid, or a liquid, and which may be utilized as a source of energy for the IGCC system. By way of non-limiting example, the feedstock 102 may include coal, petroleum coke, oil, biomass, wood-based materials, agricultural wastes, tars, coke oven gas and asphalt, or other carbon containing items.

The fuel of the feedstock 102 may be passed to a feedstock preparation unit 104. The feedstock preparation unit 104 may, for example, resize or reshape the fuel to generate feedstock 102. Additionally, water, or other suitable liquids (e.g., alcohols) may be added to the feedstock 102 in the feedstock preparation unit 104 to create slurry feedstock. In other embodiments, no liquid is added to the feedstock 102, thus yielding dry feedstock. In further embodiments, the feedstock preparation unit 104 may be omitted if the feedstock 102 is a liquid.

A feed injector 106 coupled to (e.g., secured to and/or within) a gasifier 108 delivers the feedstock 102 from the feedstock preparation unit 104 to the gasifier 108. While the present embodiments are discussed in the context of an IGCC system having a gasifier that utilizes the feed injector and the protective shell disclosed herein, it should be noted that the gasifier 108 is merely one example of a combustion chamber that may use the feed injector 106 with the structural supports and multiple coolant passages as discussed in detail below. Indeed, the feed injector 106 having the protective shell of the present disclosure may be utilized in a variety of other contexts where reactions or combustion processes may degrade an injector. In certain embodiments, the feed injector 106 combines the various feed streams to the gasifier 108 in such a manner as to promote efficient gasification. Specifically, the gasifier 108 may convert the feedstock 102 into a syngas, e.g., a combination of carbon monoxide and hydrogen. This conversion may be accomplished by subjecting the feedstock 102 to a controlled amount of steam, oxygen, or carbon dioxide at elevated pressures and temperatures, depending on the type of gasifier 108 utilized. The gasification process may include the feedstock 102 undergoing a pyrolysis process, whereby the feedstock 102 is heated. Temperatures inside the gasifier 108 may widely vary, and as an example, can range from approximately 150° C. to 700° C. during the pyrolysis process, depending on the feedstock 102 utilized. The heating of the feedstock 102 during the pyrolysis process may generate a solid (e.g., char) and residue gases (e.g., carbon monoxide, hydrogen, and nitrogen).

A partial oxidation process may then occur in the gasifier 108. The oxidation may include introducing controlled amounts of oxygen to the char and residue gases (e.g., via the feed injector 106). The char and residue gases may react with the oxygen to form carbon dioxide and carbon monoxide, which provides heat for the subsequent gasification reactions. The temperatures during the partial combustion process may, as an example, range from approximately 700° C. to 920° C. Next, steam may be introduced into the gasifier 108 during a gasification step (e.g., via the feed injector 106). The char may react with the carbon dioxide and steam to produce carbon monoxide and hydrogen at temperatures ranging from approximately 800° C. to 2400° C. In essence, the gasifier 108 utilizes steam and oxygen to allow some of the feedstock to partially oxidize to produce carbon monoxide and release energy, which drives a second reaction that converts further feedstock (e.g., feedstock 102) to hydrogen and additional carbon dioxide. In view of the foregoing, it should be appreciated that the feed injector 106 may be subjected to a wide variety of temperatures and potentially corrosive materials. Again, the protective shell of the present disclosure, which is attached to the feed injector 106, may help mitigate the effects of these high temperature gases on the feed injector 106 (e.g., a tip and/or body of the feed injector 106).

For example, the resultant gas generated by the gasification process may include mainly carbon monoxide and hydrogen, as well as $CH_4$, HCl, HF, COS, $NH_3$, HCN, and $H_2S$. This resultant gas may be termed untreated syngas (e.g., untreated syngas 110), because it includes, for example, $H_2S$. In addition to the gaseous products, the gasifier 108 may also generate waste, such as slag 112, which may be a wet ash material. This slag 112 may be removed from the gasifier 108 and disposed of, for example, as road base or as another building material.

A gas purifier 114 may be utilized downstream of the gasifier 108 to process the untreated syngas 110. The gas purifier 114 may scrub the untreated syngas to remove the HCl, HF, COS, HCN, and $H_2S$ from the untreated syngas, and may include a sulfur processor 118 to remove sulfur 120 by, for example, an acid gas removal process in the sulfur processor 118. Furthermore, the gas purifier 114 may separate salts 122 from the untreated syngas via a water treatment unit 124 that may utilize water purification techniques to generate usable salts 122 from the untreated syngas 110. Subsequently, the gas from the gas purifier 114 may include treated syngas 126 (e.g., the sulfur 120 has been removed from the syngas), with trace amounts of other chemicals, e.g., $NH_3$ (ammonia) and $CH_4$ (methane).

The treated syngas 126 may be transmitted to a power block 130. For example, the power block 130 may include a combustor of a gas turbine engine, which may utilize the treated syngas 126 as combustible fuel. The gas turbine engine may drive a load, such as an electrical generator for producing electrical power. In certain embodiments, the power block 130 may also include a heat recovery steam generator (HRSG). The HRSG may provide steam 132 to the gasifier 108, which may be utilized during the gasification process.

Additionally, the heat recovery steam generator may provide steam to a steam turbine engine for power generation, e.g., an electrical generator driven by a steam turbine. Additionally or alternatively, the steam produced by the HRSG may be supplied to the feed injector 106 as a coolant 142. The hot recirculating gases inside the gasifier 108 may thermally stress the feed injector 106, particularly the portion of the feed injector 106 closest to the combustion chamber (e.g., the tip of the feed injector 106). Again, the feed injector protective shell of the present embodiments may reduce thermal stress and corrosion on the feed injector 106 by at least partially blocking the recirculating gases, thereby keeping them from contacting the feed injector 106. By reducing thermal stress and thermal fatigue on the feed injector 106, the protective shell may extend the life cycle and reduce the operational costs of the system 100.

The IGCC system 100 may further include an air separation unit (ASU) 138. The ASU 138 may operate to separate air into component gases by, for example, distillation techniques. The ASU 138 may separate oxygen 140 from the air supplied to it from a supplemental air compressor, and the ASU 138 may transfer separated oxygen 140 to the feed injector 106. Additionally, the ASU 138 may transmit separated nitrogen 144 to the feed injector 106 (e.g., as coolant 142).

Figure 2:
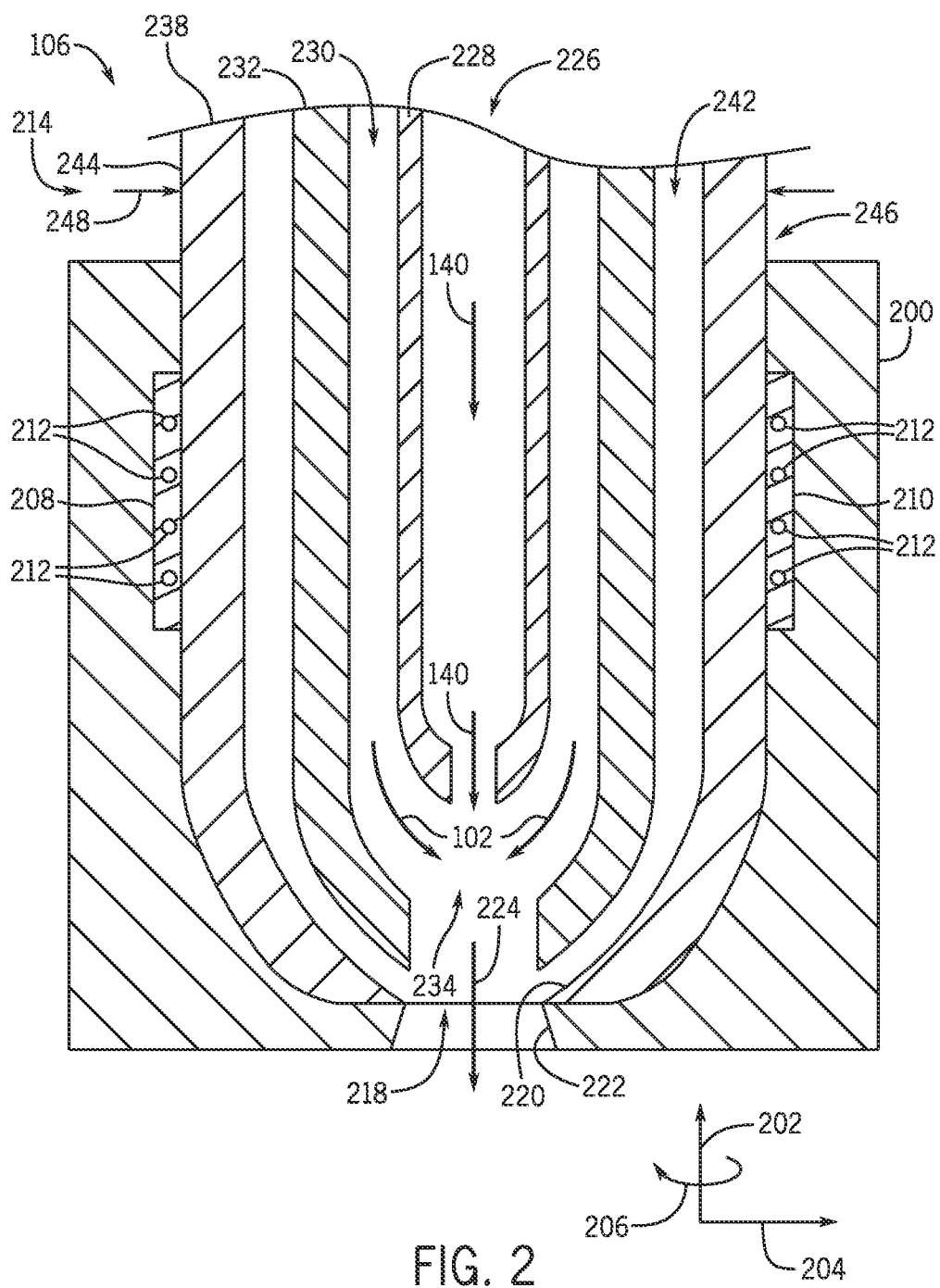
FIG. 2 is a partial cross-sectional view of an embodiment of the feed injector of FIG. 1 coupled to a protective shell.

With the forgoing in mind, FIG. 2 is an axial cross-section of the feed injector 106 having a protective shell 200 (e.g., a one piece or multi-piece segmented protective shell) surrounding one or more bayonets (e.g., conduits or hollow bodies) of the feed injector 106. Certain features of the feed injector 106 have been omitted to facilitate discussion of FIG. 2. The feed injector 106 may have an axial axis or direction 202, a radial axis or direction 204 away from axis 202, and a circumferential direction 206 around axis 202. The protective shell 200 may be coupled to the feed injector 106 along the axial axis 202 via one or more structural plates 208 and 210 (e.g., mounting structures), as will be described in further detail below with reference to FIG. 9. The structural plates 208 and 210 may also include one or more openings 212 to facilitate coupling of the feed injector 106 and the protective shell 200. The feed injector has an upstream side 214 (e.g., relative to a flow of fuel through the feed injector 106), from which gasification components (e.g., the fuel source 102, oxygen 140, and other materials) may be introduced to the feed injector 106. The feed injector 106 also includes an annular opening 218 positioned at a feed injector tip 220 (e.g., fluid outlet or nozzle), where the gasification components may exit the feed injector 106 through a protective shell opening 222, as indicated by arrow 224.

The feed injector 106 may include one or more bayonets (e.g., fluid conduits, hollow bodies, or injectors) that provide a passage for the feedstock 102, oxygen 140, and other gasification materials entering the gasifier 106. Although one arrangement of passages will be described, other arrangements are possible depending on the requirements of a particular system (e.g., reactor, gasifier, or general oxidation system). In the illustrated embodiment, the innermost material passing through the feed injector 106 is the oxygen 140 (e.g., separated oxygen from the ASU 138), which is directed to the feed injector tip 220 by a first passage 226 formed by a first annular wall 228 (e.g., first fluid conduit) of the feed injector 106. As should be noted, the oxygen 140 may include pure oxygen, oxygen mixtures, and/or air. The next outermost material may be the feedstock 102, which is directed to the feed injector tip 220 by a second passage 230 formed by a second annular wall 232 (e.g., second fluid conduit). The second passage 230 surrounds the first passage 226 in a coaxial or concentric arrangement. Similar to the first passage 224, the second passage 230 (e.g., conduit 232) directs the feedstock 102 just downstream of the oxygen 140 from the first passage 226 to enhance mixing of the feedstock 102 and the oxygen 140 prior to entering the gasifier 108. The region where the feedstock 102 and the oxygen 140 combine may be referred to as a throat or pre-mix zone 234.

The feed injector 106 may also include a third annular wall 238 (e.g., third fluid conduit) that forms a third passage 242. Thus, the third passage 242 (e.g., conduit 238) surrounds the first passage 226 (e.g., conduit 228) and the second passage 230 (e.g., conduit 232) in a coaxial and or concentric arrangement. As should be noted, the third annular wall 238 coincides with (or may be described as) an outer bayonet wall 244 of the feed injector 106, and thereby forms a bayonet 246 having an outer bayonet diameter 248. The third passage 242 may direct other gasification materials (e.g., steam) or additional oxygen (e.g., the oxygen 140) to the mixture of the feedstock 102 and the oxygen 140 from the pre-mix zone 234. As such, the feed injector 106 may produce a fine spray, which may enhance the efficiency of the gasification reactions (e.g., partial oxidation) in the gasifier 108. In the illustrated embodiment, the protective shell 200 extends past the feed injector tip 220 in the axial direction 202. However, in other embodiments, the protective shell opening 222 may be flush with the feed injector tip 220.

FIG. 3 is a partial cross-sectional view of the feed injector 106, including the protective shell 200, coupled to the gasifier 108. The feed injector 106 may include additional components to facilitate coupling with the gasifier 108. For example, the feed injector 106 includes an injector mounting flange 300 (e.g., an annular flange) that couples to a gasifier flange 302 and secures (e.g., via bolted joints) the feed injector 106 to the gasifier 108. As discussed above, the feed injector 106 may be exposed to temperatures above 700° C. during operation of the gasification system 100. Accordingly, the feed injector 106 may include multiple cooling passages that flow a coolant (e.g., liquid coolant 142, such as water) towards the feed injector tip 220 to facilitate cooling of the tip during gasification. For example, in the illustrated embodiment, the feed injector 106 includes a cooling coil 308 that supplies the coolant 142 to one or more cooling coil channels 310 surrounding (e.g., along axis 206) at least a portion of the feed injector tip 220. In certain embodiments, the cooling coil channel 310 may also surround a portion of the bayonet 246 above the feed injector tip 220. The feed injector tip 220 includes a tip inlet port 312 (e.g., a radial port) and a tip outlet port 314 (e.g., a radial port) that each couple to corresponding inlet and outlet passages 316 and 318, respectively. As such, the coolant 142 may be circulated in and out of the feed injector tip 220, as indicated by arrows 320. In this way, the coolant 142 may cool the feed injector tip 220 and mitigate the effects of gasification temperatures on the feed injector tip 220. As such, the feed injector tip 220 may have an increased life. In other embodiments, a portion of the cooling coil 308 may be wrapped (e.g., form a helix and/or coil) circumferentially (e.g., axis 206) around an outer surface of the feed injector tip 220. The cooling coil 308 may be manufactured from heat and corrosive resistant materials such as, but not limited to, nickel-chromium alloys, for example, INCONEL® 600, INCONEL® 625, INCOLOY® 800, and INCOLOY® 825, or any other suitable material and combinations thereof. In certain embodiments, the cooling coil 308 may include an anti-corrosive coating (e.g., Aluminium oxide, Chromium oxide, Zirconium oxide, Chromium carbide, Tungsten carbide). The cooling coil 308 may also be wrapped or coated with a burnout material on the surface to provide a slip plane during coupling of the protective shell 200 and feed injector 106. As the burnout material burns or evaporates during operation of feed injector, it provides a clearance between the surfaces of cooling coil 308 and cooling coil recess 424. This may decrease cooling coil fatigue associated with thermal expansion, and thereby reduce stress on cooling coil surfaces during use. Examples of the burnout material include polyester, vinylester, epoxy resins or burnout paper, or any other suitable material, or combinations thereof.

In addition to the cooling coil 308, the protective shell 200 may also protect the bayonet 246 and the feed injector tip 220 from the gasification environment within the gasifier 108. As discussed above, with reference to FIG. 2, the protective shell 200 circumferentially surrounds (e.g., around axis 206) at least a portion of the bayonet 246 and the feed injector tip 220. The protective shell 200 may act as a physical barrier, a thermal barrier, a chemical barrier, or any combination thereof. In certain embodiments, the protective shell 200 may cover (e.g., axially 202 and circumferentially 206) approximately 75% or more of the bayonet 246 that is below the gasifier flange 302. For example, the protective shell 200 may cover greater than or equal to approximately 10%, 20%, 30%, 40%, 50%, 60%, 70%, 80%, 90%, 95%, or 100% of the feed injector 106 below the gasifier flange 302. Examples of materials that may be used for the protective shell 200 include, but are not limited to, refractory materials, refractory metals, non-metallic materials, clays, ceramics, cements, and oxides of aluminum, silicon, magnesium, calcium, and combinations thereof.

By surrounding the feed injector 106 with the protective shell 200, the protective shell 200 may mitigate thermal stress and corrosion of the feed injector tip 220 and the bayonet 246. For example, the protective shell 200 may decrease the temperature the feed injector 106 may be exposed to. Additionally, the protective shell 200 may block corrosive materials (e.g., sulfur, chloride, etc.) generated during gasification of the feedstock 102 from reaching, or otherwise contacting, the bayonet 246 and the feed injector tip 220. Therefore, the overall life of the feed injector 106 (e.g., the bayonet 246 and the feed injector tip 220) may be increased. Advantageously, the operational costs associated with the gasification system 100 may be decreased as a result of less frequent feed injector tip replacement. Moreover, the materials generally used to fabricate the feed injector tip 220 and the bayonet 246 may be replaced with less expensive materials, further reducing the overall cost of the gasification system 100. Examples of materials that may be used to fabricate the feed injector tip 220 and bayonet 246 include, but are not limited to, nickel-chromium alloys, such as INCONEL® 600, INCONEL® 625, INCOLOY® 800, and INCOLOY® 825, or any other suitable material and combinations thereof. As should be noted, the feed injector tip 220 and the bayonet 246 may also have anti-corrosive coatings (e.g., Aluminium oxide, Chromium oxide, Zirconium oxide, Chromium carbide, Tungsten carbide).

The protective barrier 200 may be secured onto the feed injector 106 via a bolted joint connection or any other suitable method. As discussed above, the protective shell 200 may be attached to the feed injector 106 with the structural plates 208 and 210. The structural plates 208 and 210 may radially (e.g., axis 204) extend from the bayonet 246, and may be positioned directly across from each other (e.g., 180° apart from one another along radial axis 204). The structural plates 208 and 210 may each be separate pieces that are welded, bolted, screwed, or otherwise secured onto the outer bayonet wall 244. This may facilitate retrofitting feed injectors already in use with the protective shell 200. In certain embodiments, the outer bayonet wall 244 may include one or more recesses or grooves 330 (e.g., mounting structures), as illustrated in FIG. 4, to facilitate coupling and alignment of the structural plates 208 and 210 to the protective shell 200. In certain embodiments, the outer bayonet wall 244 may not include any recesses or grooves 330 (e.g., mounting structures). In certain embodiments, the bayonet 246 may have a recess 330 for each structural plate (e.g., structural plate 208 and 210). That is, the recess 330 may be on a portion of the outer bayonet wall 244 where the structural plate 208 and 210 are to be secured. In this way, each structural plate may be partially inserted into a corresponding recess 330 and secured using any suitable method (e.g., welding, bolt jointed, etc.).

In certain embodiments, the structural plates 208 and 210 may be part of a single structure. FIG. 5 illustrates a cylindrical ring 340 that includes the structural plates 208 and 210. The cylindrical ring 340 includes a body 342 (e.g., annular body) that supports the structural plates 208 and 210 (e.g., radially protruding plates extending along axial plane) and a bore 344 to facilitate coupling of the cylindrical ring 340 with the feed injector 106. The bore 344 may have an inner diameter 348 that is at least equal to the outer bayonet diameter 248. In use, the bayonet 246 is inserted into the bore 344 such that the cylindrical ring 340 surrounds a portion of the bayonet 246.

FIG. 6 illustrates an embodiment of the cylindrical ring. In this particular embodiment, a jointed cylindrical ring 350 (e.g., a hinged annular ring) includes a hinge 352 (e.g., along axial axis 202) that allows the jointed cylindrical ring 350 to open first and second ring segments 351 and 353 (e.g., ring halves) in a radial direction (e.g., axis 204), as indicated by arrows 354. This may facilitate coupling the jointed cylindrical ring 350 to the feed injector 106. Side walls 356 and 358 may be welded or bolted together before or after coupling with the bayonet 246. Similar to the cylindrical ring 340 of FIG. 5, the jointed cylindrical ring 350 may be welded, bolted, or screwed onto the bayonet 246. In certain embodiments, the jointed cylindrical ring 350 is inserted into the recess 330, for example, in embodiments where the recess 330 circumferentially (e.g., direction 206) surrounds the bayonet 246.

As discussed above, the feed injector 106 includes the protective shell 200 to reduce the effects of gasification conditions (e.g., high temperature and corrosive environment) on the feed injector tip 220 and the bayonet 246. The protective shell 200 may be manufactured from refractory material (e.g., High or Dense alumina, Silicon carbide, Silicon fiber or Silicon whisker in Silicon carbide matrix composite or combinations thereof). Accordingly, the protective shell 200 may include a number of features that facilitate coupling to the feed injector 106. For example, the protective shell 200 may include a plurality of protective shell portions (e.g., segments), such as a first protective shell portion and a second protective shell portion. In certain embodiments, the first and second protective shell portions may be a single structure. In other embodiments, the first and second protective shell portion may be separate structures. By having two separate halves (or multiple segments), the protective shell 200 may be easily removed during replacement of feed injector tips (e.g., the feed injector tip 220). In addition, such a configuration may facilitate retrofitting feed injectors currently in use with the protective shell 200. FIG. 7 illustrates a first protective shell portion 400 of a multi-section protective shell. To facilitate discussion of FIG. 7, reference will only made to the first protective shell portion 400. However, it is understood that the second protective shell portion includes similar features and configurations to that of the first protective shell portion 400. The first protective shell portion 400 includes a shell body 402 having an inner shell surface 404 (e.g., annular surface or semi-annular surface) that may be in physical contact with the outer bayonet wall 244 and an outer shell surface 406 that faces a gasification zone of the gasifier 108 during use. In certain embodiments, the outer shell surface 406 may include slots or recesses, circumferentially distributed, that may decrease a velocity of the untreated syngas 110 generated within the gasifier 108. Additionally, an inner shell wall 410 may have filleted (e.g., rounded) edges 411 to reduce cracking propagation of cracks that may form on the protective shell 200 over time.

The first protective shell portion 400 also includes a feed injector passage 408 having a radial width 412 that is at least equal to or greater than the outer bayonet diameter 248. As such, the outer bayonet wall 244 may be in contact with the inner shell surface 404. The feed injector passage 408 may also have a tapered portion 416 at or near a shell terminating end 418 (e.g., axial end) that is designed to conform to the feed injector tip 220. As such, the radial width 412 at the tapered portion 416 decreases towards the shell terminating end 418. In certain embodiments, the shell terminating end 418 extends past the tapered portion 416. In this way, the feed injector tip 220 is not in direct contact with the gasification temperatures and the untreated syngas 110 when the protective shell 200 is coupled to the feed injector 106. The shell terminating end 418 includes a first shell portion opening 420 that partially forms the protective shell opening 222 when the first protective shell portion 400 and second protective shell portion are coupled to one another as will be described below with reference to FIG. 9. In the illustrated embodiment, the first shell portion opening 420 has a tapered configuration (e.g., conical or curved annular profile) such that a width of the first shell portion opening 420 increases toward the shell terminating end 418 (e.g., diverges in downstream direction of flow). This may facilitate the spread of the gasification components (e.g., the feedstock 102 and the oxygen 140) into the gasifier 108. However, the first shell portion opening 420 may have any other suitable configuration (e.g., non-tapered in certain embodiments).

Figure 10:
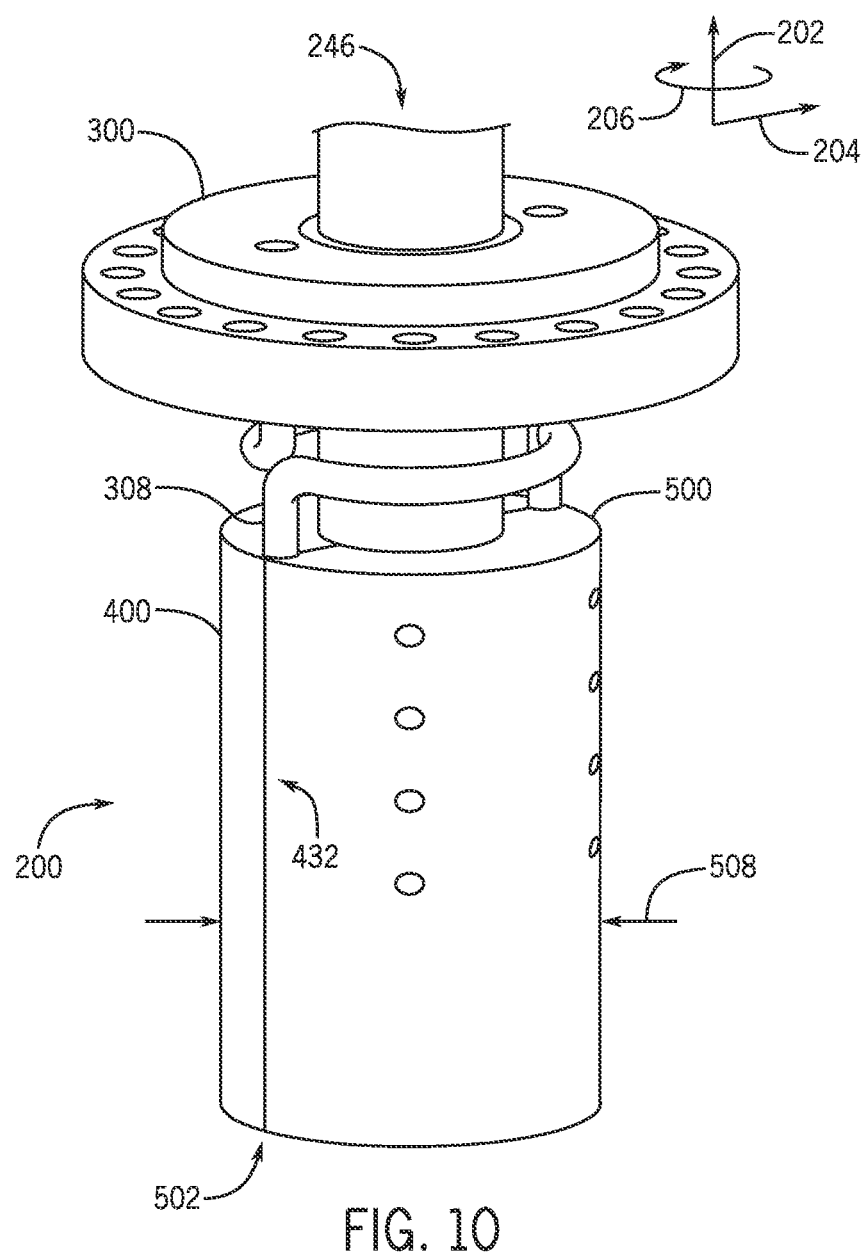
FIG. 10 is perspective view of an embodiment of a protective shell surrounding the feed injector of FIG. 2.

In addition to the feed injector passage 408, the first shell portion 400 may include a cooling coil recess 424 on the inner shell wall 410 to accommodate the cooling coil 308 and tip inlet and outlet ports 316 and 318, respectively. The cooling coil recess 424 has a width that is at least approximately equal to a width of the cooling coil 308 and/or the tip inlet port 316 and tip outlet port 318. As discussed above, the protective shell 200 may be secured onto the feed injector 106 through the structural plates 208 and 210. Accordingly, the inner shell wall 410 may also include one or more plate recesses 430 (e.g., radially outward recesses extending along an axial plane). During coupling of the protective shell 200 and the feed injector 106, the structural plates 208 and 210 may be inserted into a respective plate recess 430. This may facilitate aligning and positioning of the first protective shell portion 400 with a corresponding second protective shell portion on the feed injector 106. In addition, by having the structural plates 208 and 210 in each respective plate recess 430, the protective shell 200 may form a tight seal 432 once assembled on the feed injector 106, as illustrated in FIG. 10. Therefore, the untreated syngas 110 may be blocked from entering the protective shell 200 and contacting the feed injector 106. As should be noted, the inner shell wall 410 may include additional recesses to support other components that may be utilized with the protective shell 200 and feed injector 106 (e.g., seals, gaskets, etc.).

To facilitate coupling and securing the protective shell 200 to the structural plates 208 and 210, the first protective shell portion 400 includes one or more outer shell wall openings 434 and inner shell wall openings 436. Each set of outer and inner shell wall openings 434 and 436, respectively, are coupled by an inner shell channel (e.g., passage) 440 that extends (e.g., along axis 204) through the shell body 402. As discussed in further detail below, with reference to FIG. 9, the outer and inner shell wall openings 434 and 436, respectively, are directly aligned with the structural plate openings 212 when the protective shell 200 is coupled to the feed injector 106.

In certain embodiments, the protective shell 200 may have structural supports or enhancers to provide structural rigidity. Accordingly, the protective shell 200 may include one or more stiffeners 446. During manufacturing of each protective shell portion (e.g., the first protective shell portion 400), the stiffener 446 may be placed inside a mold before filling the mold with protective shell refractory materials. In this way, the stiffener 446 may be fully surrounded by the protective shell refractory materials and may be incorporated into the shell body 402, as illustrated in FIG. 8. The stiffener 446 includes stiffener openings 448 that align with the outer and inner shell wall openings 434 and 436, respectively. While in the illustrated embodiment, the stiffener 446 has a cage-like configuration (e.g., a grid or mesh of axial supports and circumferential supports coupled together), the stiffener 446 may have any other suitable configuration that improves the structural rigidity of the protective shell 200. In certain embodiments, the length 449 is less than the shell length 450. For example, the stiffener 446 may have a length 449 that is less than the shell length 450 by approximately 10%, 20%, 30%, 40%, 50%, 60%, or more. The stiffener 446 may be fabricated from pressure and temperature resistant materials such as, but not limited to, stainless steel, such as SS310 and SS316L, nickel-chromium alloys, such as INCONEL® 600, INCONEL® 625, INCOLOY® 800, INCOLOY® 825, or any other suitable material, or combinations thereof. As should be noted, the stiffener 446 may also include other materials (e.g., fillers, resins) to facilitate manufacturing and control costs. In other embodiments, the stiffener materials may be blended (e.g., mixed) with the refractory materials prior to pouring in the mold. In particular embodiments, the stiffener 446 may or may not be used.

Figure 9:
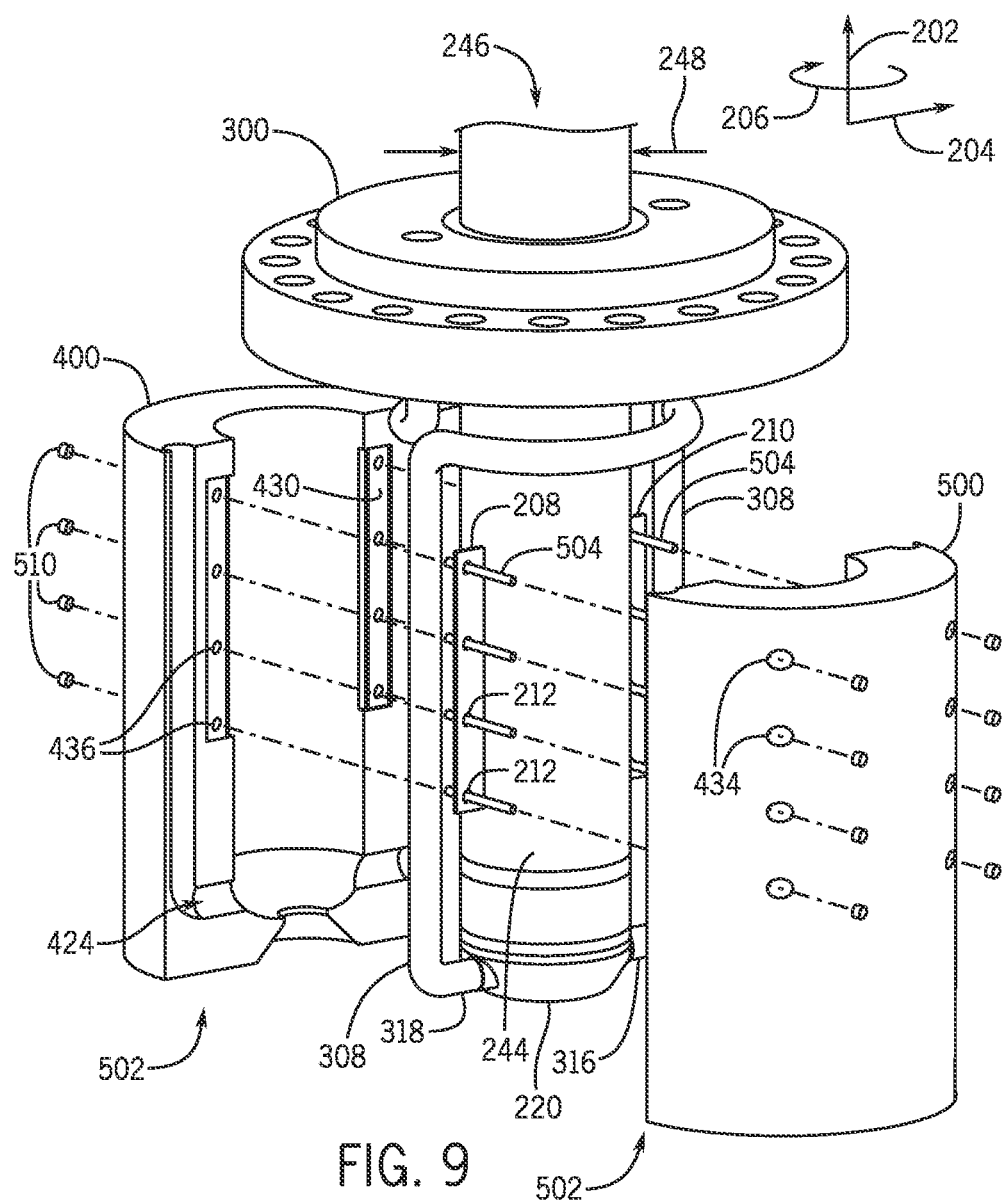
FIG. 9 is an exploded perspective view of an embodiment of a multi-section protective shell being coupled to the feed injector of FIG. 2.

As discussed above, the protective shell 200 surrounds one or more bayonets (e.g., bayonet 246) of the feed injector 106. FIG. 9 is an exploded perspective view illustrating a process of assembling the protective shell 200 on the feed injector 106. In the illustrated embodiment, the first protective shell portion 400 and a second protective shell portion 500 are aligned with the cooling coil 308 and the structural plates 208 and 210. For example, the cooling coil recess 424 is aligned with the cooling coil 308 and the cooling inlet and outlet ports 316 and 318, respectively. The plate recesses 430 of each protective shell portion (e.g., first and second protective shell portions 400 and 500) are also aligned with the respective structural plates 208 and 210. By positioning the cooling coil 308 at an interface 502 between the first and second protective shell portions 400 and 500, respectively, the cooling coil 308 may block the untreated syngas 110 from leaking into the protective shell 200. However, if the untreated syngas 110 were to leak into the protective shell 200 during use, the cooling coil 308 may act as an additional barrier to block the untreated syngas from contacting the outer bayonet wall 244. In addition, the cooling coil 308 may cool any untreated syngas 110 that may leak into the protective shell 200. As such, any untreated syngas 110 that may reach the outer bayonet wall 244 or the feed injector tip 220 may not affect the durability and life of the feed injector 106. For example, the cooled untreated syngas may not cause thermal stress on the feed injector tip 220 or the bayonet 246 that may otherwise be caused by high temperature untreated syngas 110. Moreover, because the cooling coil 308 is manufactured from corrosive resistant materials, or may include an anti-corrosive coating, the undesired effects of corrosive components that may be mixed with the untreated syngas 110 may also be mitigated. In certain embodiments, a purge gas may flow in a space between the protective shell 200 and the outer bayonet wall 244.

Before, during, or after alignment of the first protective shell portion 400 and second protective shell portion 500, securing hardware 504 (e.g., bolts, screws, rods, etc.) may be inserted into the structural plate openings 212. The securing hardware 504 may have a length that is at least approximately equal to an outer shell width 508, as illustrated in FIG. 10. As such, the securing hardware 504 may pass completely through the inner shell channels 440 of each respective protective shell half 400 and 500. As should be noted, the securing hardware 504 (e.g., threaded rods) may first be inserted into the inner shell channels 440 of the first protective shell portion 400 and pushed through respective structural plate openings 212 and inner shell channels 440 of the corresponding second protective shell portion 500.

Once inserted into the respective openings (e.g., openings 212, 434 and 436), removable fasteners 510 (e.g., nuts) may be coupled to respective securing hardware 504 (e.g., threaded rods). As should be noted, additional hardware (e.g., washers or the like) may be disposed on the securing hardware 504 before coupling to the removable fasteners 510 (e.g., nuts). In certain embodiments, the securing hardware 504 may be threaded at both ends such that the removable fasteners 510 may be coupled to each end of the securing hardware 504 during assembly of the protective shell 200 on the feed injector 106. In other embodiments, the securing hardware 504 may have a flanged end and a threaded end for coupling with the removable fastener 510. In this way, the first and second protective shell portions 400 and 500, respectively, are coupled to the feed injector 106, as illustrated in FIG. 10. Accordingly, degradation of feed injector bayonets (e.g., bayonet 246) and feed injector tips (e.g., the feed injector tip 220) caused by the high temperature and corrosive environment of the gasifier 108 may be blocked or decreased. Therefore, feed injector bayonets and tips may be replaced less often and may also be manufactured from less expensive materials. As such, manufacturing and operational costs of the feed injector 106 and the gasification system (e.g., the gasification system 100), respectively, may be decreased. In addition, by securing the protective shell 200 using the securing rods 504 and the removable fasteners 510, the protective shell 200 may be easily removed during feed injector maintenance (e.g., cleaning) or replacement (e.g., feed injector tip replacement). As should be noted, oil feed injectors may have a longer life (e.g., greater than one year) compared to slurry feed injectors. Accordingly, oil feed injectors may have less maintenance requirements and may be replaced less often. Therefore, in embodiments where the feedstock 102 is oil, the protective shell 200 may be formed from a single piece and welded onto the bayonet 246, and thus may not be removable.

The securing hardware 504 and the removable fasteners 510 may be made from similar high temperature and anti-corrosive materials used for the cooling coil 308. Examples of materials include, but are not limited to, nickel-chromium alloys, such as INCONEL® 600, INCONEL® 625, INCOLOY® 800, and INCOLOY® 825, or any other suitable material, or combinations thereof. In certain embodiments, the securing hardware 504 and removable fasteners 510 may be coated with anti-corrosive materials. The outer shell wall openings 434 may also be filled (e.g., sealed, plugged) with a refractory material to block the untreated syngas 110 from contacting shell hardware (e.g., the securing hardware 504 and removable fasteners 510) and leaking into the protective shell 200. During decoupling of the protective shell 200 from the feed injector 106, the refractory material in the outer shell wall openings 434 may be removed to access the removable fasteners 510. As should be noted, the securing hardware 504 may be cut to any desired length before, during, or after securing the protective shell 200 to the feed injector 106. Accordingly, the securing hardware 504 may not be exposed to the gasification zone and the outer shell wall openings 434 may be filled with the refractory material.

As described above, certain embodiments of the feed injector 106 include surrounding a portion of the feed injector bayonets (e.g., the bayonet 246) and the feed injector tip 220 with the protective shell 200. The protective shell 200 may decrease or block the high temperature untreated syngas 110 from contacting feed injector outer surfaces (e.g., the feed injector tip 220 and the bayonet 246). As such, the feed injector tip 220 and the bayonet 246 may not be exposed to the gasification zones, and the undesirable effects associated with the high gasification temperatures and the corrosive materials generated during gasification may be mitigated. By coupling the feed injector 106 with the protective shell 200, the overall life of the feed injector 106 (e.g., the feed injector tip 220 and the bayonet 246) may be increased. Moreover, the feed injector tip 220 and the bayonet 246 may be manufactured from less expensive materials, and thereby reduce the overall manufacturing and operational costs of the feed injector 106 and the gasification system 100, respectively. Additionally, the configuration of the protective shell 200 facilitates feed injector tip replacement and may be easily retrofitted with existing feed injectors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a feed injector configured to supply a feedstock to a gasifier, wherein the feed injector comprises:
   one or more conduits extending toward a tip portion having an outlet;
   a cooling coil coupled to the tip portion;
   a protective shell comprising a first protective shell portion coupled to a second protective shell portion and a central bore extending from an upstream end of the protective shell to a downstream end of the protective shell and sized to fit the one or more conduits, wherein the first and second protective shell portions are split along a longitudinal length of the one or more conduits and co-terminate below the tip portion such that the central bore is defined by a first inner surface of the first protective shell portion and a second inner surface of the second protective shell portion and terminates in a shell outlet below the tip portion, wherein the protective shell surrounds the tip portion and at least portions of an outer wall of the one or more conduits and the cooling coil; and
   one or more mounting structures disposed along and fixedly coupled to an outer perimeter of the one or more conduits, wherein the one or more mounting structures are removably coupled to the protective shell to enable removable coupling of the first protective shell portion and the second protective shell portion to the one or more conduits, and wherein the one or more mounting structures comprises one or more openings configured to align with corresponding passages in each of the first and second protective shell portions.

2. The system of claim 1, wherein a portion of the protective shell overlaps the tip portion in a radially inward direction toward the outlet.

3. The system of claim 1, wherein the one or more mounting structures comprises structural plates disposed within a first recess on an inner side wall of each of the first and second protective shell portions, and the inner side wall coincides with an interface between the first protective shell portion and the second protective shell portion.

4. The system of claim 1, wherein at least a portion of the cooling coil is disposed within a recess on an inner side wall of each of first and second protective shell portions, and the inner side wall coincides with an interface between the first protective shell portion and the second protective shell portion.

5. The system of claim 1, comprising one or more fasteners extending through one or more passages and one or more openings to secure the first and second protective shell portions and the one or more mounting structures.

6. The system of claim 1, comprising a stiffener disposed within each of the first protective shell portion and the second protective shell portion.

7. The system of claim 1, wherein the shell outlet is aligned with the outlet of the feed injector, and the protective shell overlaps the tip portion to the shell outlet.

8. The system of claim 1, wherein the one or more mounting structures abut a respective outer surface of the first and second protective shell portions.

9. A system, comprising:
   a protective shell configured to surround one or more conduits and a tip portion of a feed injector, wherein the protective shell comprises:
   a central bore extending from a first end to a second end of the protective shell, wherein the first and second ends each comprise an opening;
   a first shell portion and a second shell portion coupled together about the central bore;
   a first recess and a second recess disposed along a first portion of an inner wall of the protective shell at an interface between the first shell portion and the second shell portion, wherein the first and second recesses are configured to align with structural plates disposed along and fixedly coupled to an outer perimeter of the one or more conduits such that the structural plates are positioned between the first and second shell portions when the protective shell surrounds the one or more conduits, and wherein the structural plates are removably coupled to the protective shell to enable removable coupling of the first shell portion and the second portion to the one or more conduits;
   a channel disposed along a second portion of the inner wall of the protective shell, wherein the channel is configured to receive a cooling coil coupled to the tip portion; and
   a third recess on an inner side wall of each of the first shell portion and the second shell portion, wherein the inner side wall coincides with the interface between the first shell portion and the second shell portion, and wherein the third recess is configured to receive the cooling coil.

10. The system of claim 9, wherein the first shell portion and the second shell portion each comprise a stiffener.

11. The system of claim 9, wherein a portion of the protective shell extends beyond a downstream end of the tip portion and overlaps the tip portion in a radially inward direction toward the outlet.

12. The system of claim 9, wherein the structural plates protrude radially away from the outer perimeter of the feed injector.

13. The system of claim 9, comprising a plurality of fasteners extending through openings in the first shell portion and the second shell portion to secure the first and second shell portions to one another.

14. The system of claim 9, wherein the first shell portion and the second shell portion are two separate structures.

15. A method, comprising:
attaching a first shell portion and a second shell portion of a protective shell to an outer perimeter of a feed injector, wherein the protective shell surrounds one or more conduits and a tip portion of the feed injector, and attaching the first and second shell portions comprises:
aligning a first structural plate and a second structural plate disposed on and fixedly coupled to the outer perimeter of the feed injector with one or more recesses along an interface between the first and second shell portions such that the first and second structural plates are positioned between the first and second shell portions, wherein the structural plates are removably coupled to the protective shell to enable removable coupling of the first shell portion and the second portion to the one or more conduits, and wherein the structural plates each comprise one or more openings configured to align with corresponding passages in each of the first and second shell portions; and securing the first shell portion, the second shell portion, and the first and second structural plates to form the protective shell configured to block a syngas from contacting the outer perimeter and the tip portion.

16. The method of claim 15, comprising positioning a cooling coil coupled to the tip portion within a channel disposed along an inner wall of the protective shell.

17. The method of claim 15, wherein securing comprises fastening the first and second shell portions with a plurality of fasteners extending through openings in the first and second shell portions.

18. The method of claim 15 wherein the first shell portion and the second shell portion are two separate structures.

19. The method of claim 15, wherein the structural plates abut a respective outer surface of the first and second shell portions.

* * * * *